H. TSCHERNING.
MOLDING MACHINE.
APPLICATION FILED JULY 24, 1911.

1,155,019.

Patented Sept. 28, 1915.
16 SHEETS—SHEET 4.

Fig. 4.

Fig. 5.

Witnesses:
John Enders
W. T. Jones

Inventor:
Henry Tscherning,
by Dyrenforth, Lee, Chritton & Wiles
Attys.

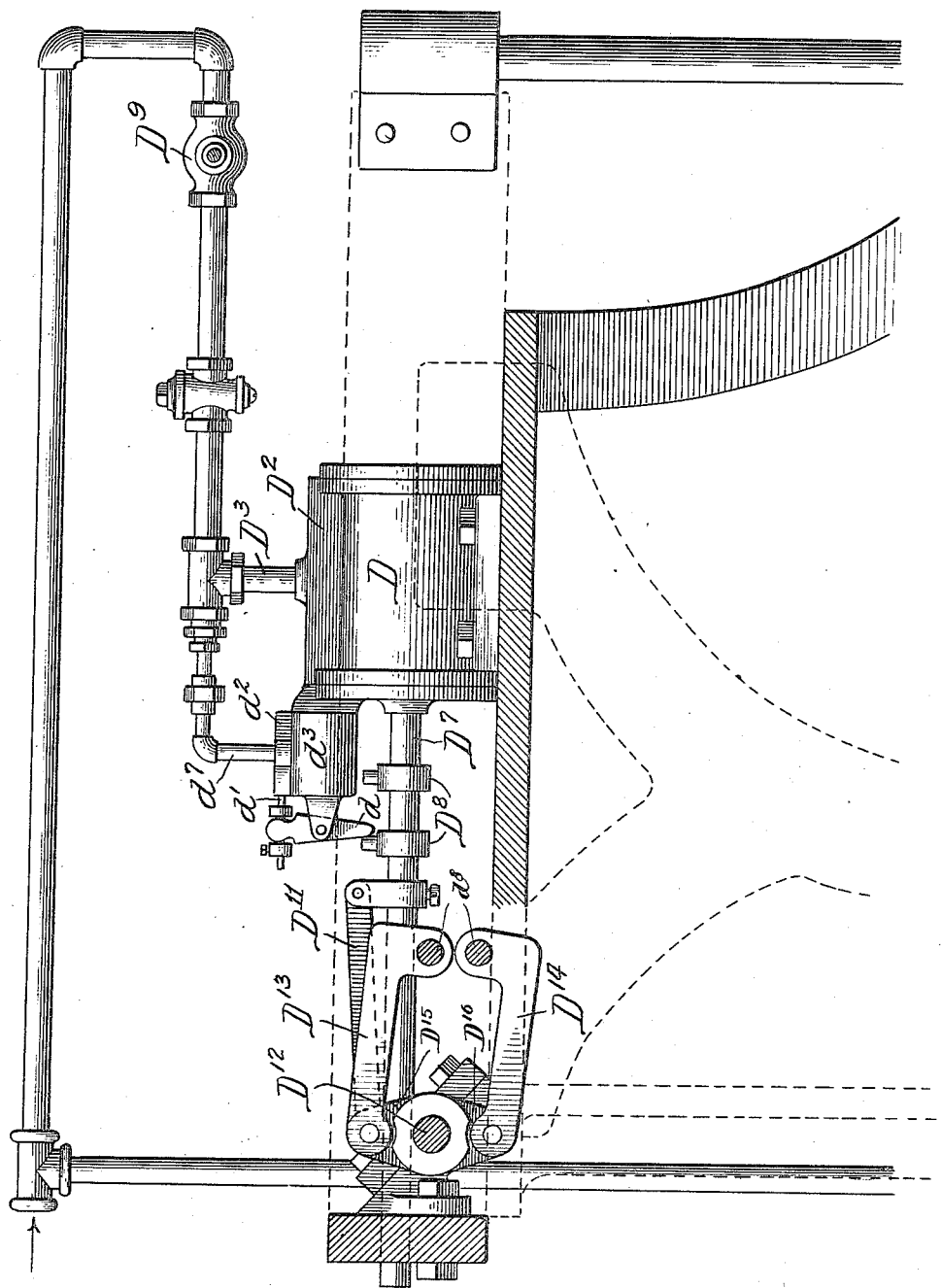

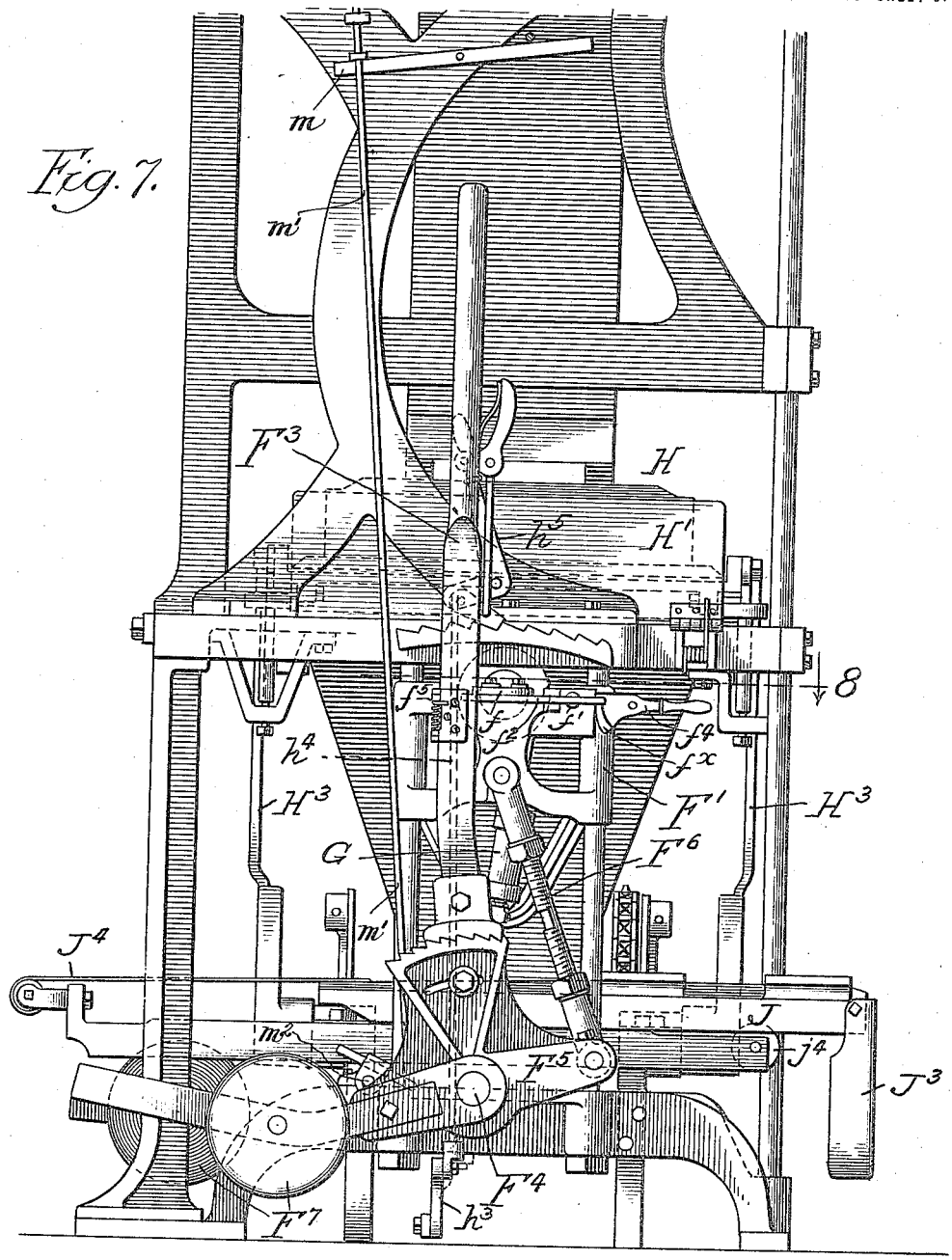

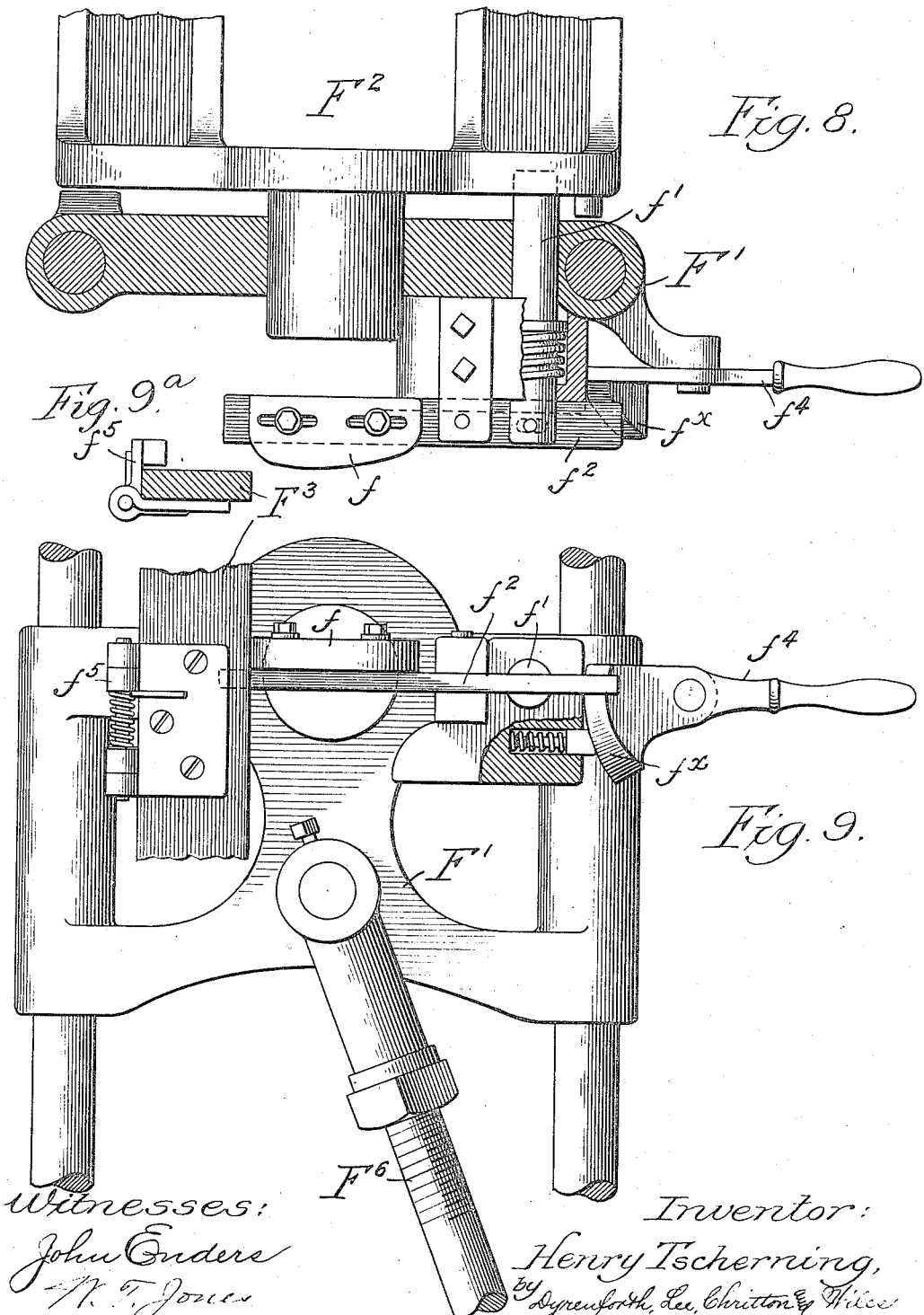

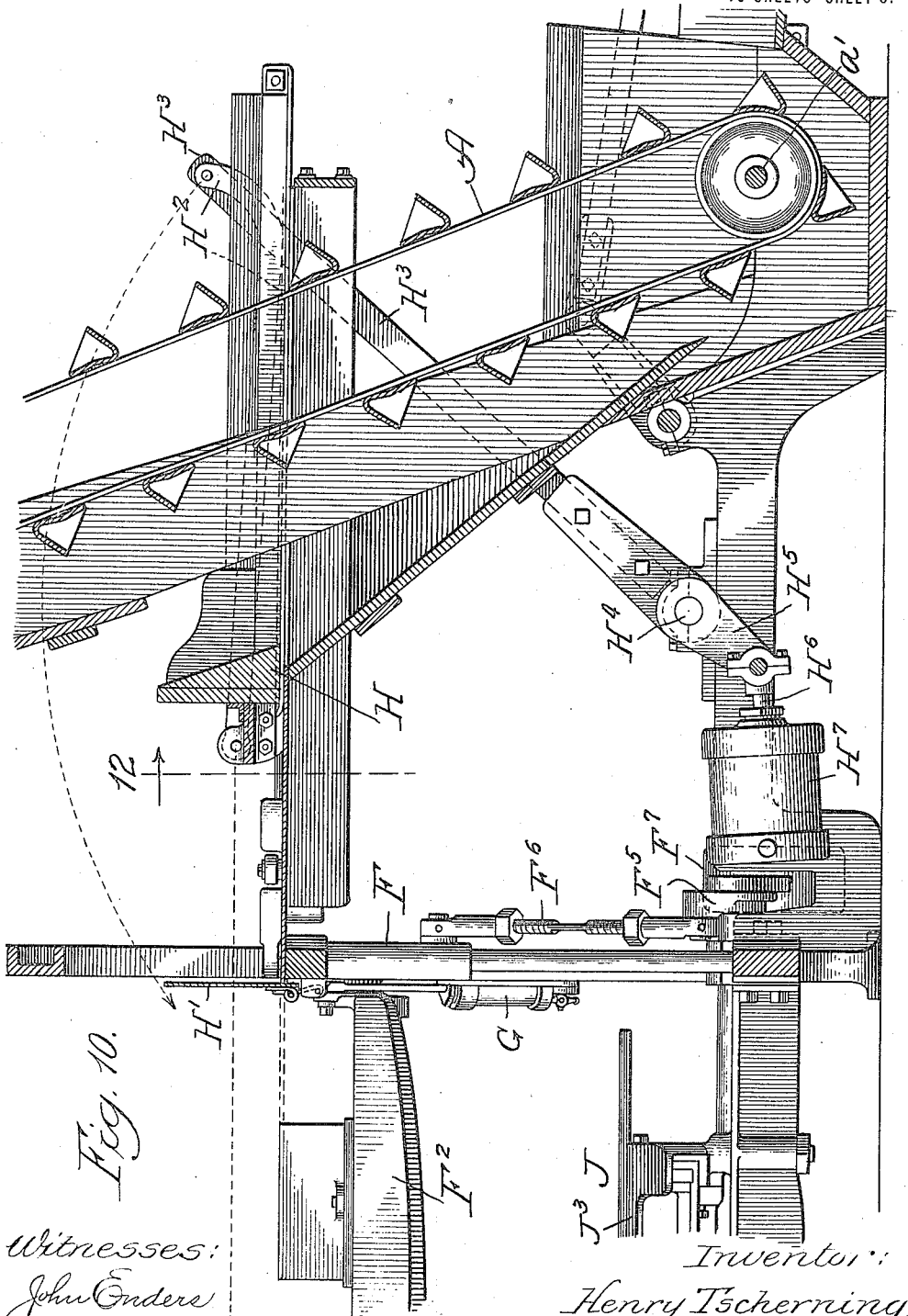

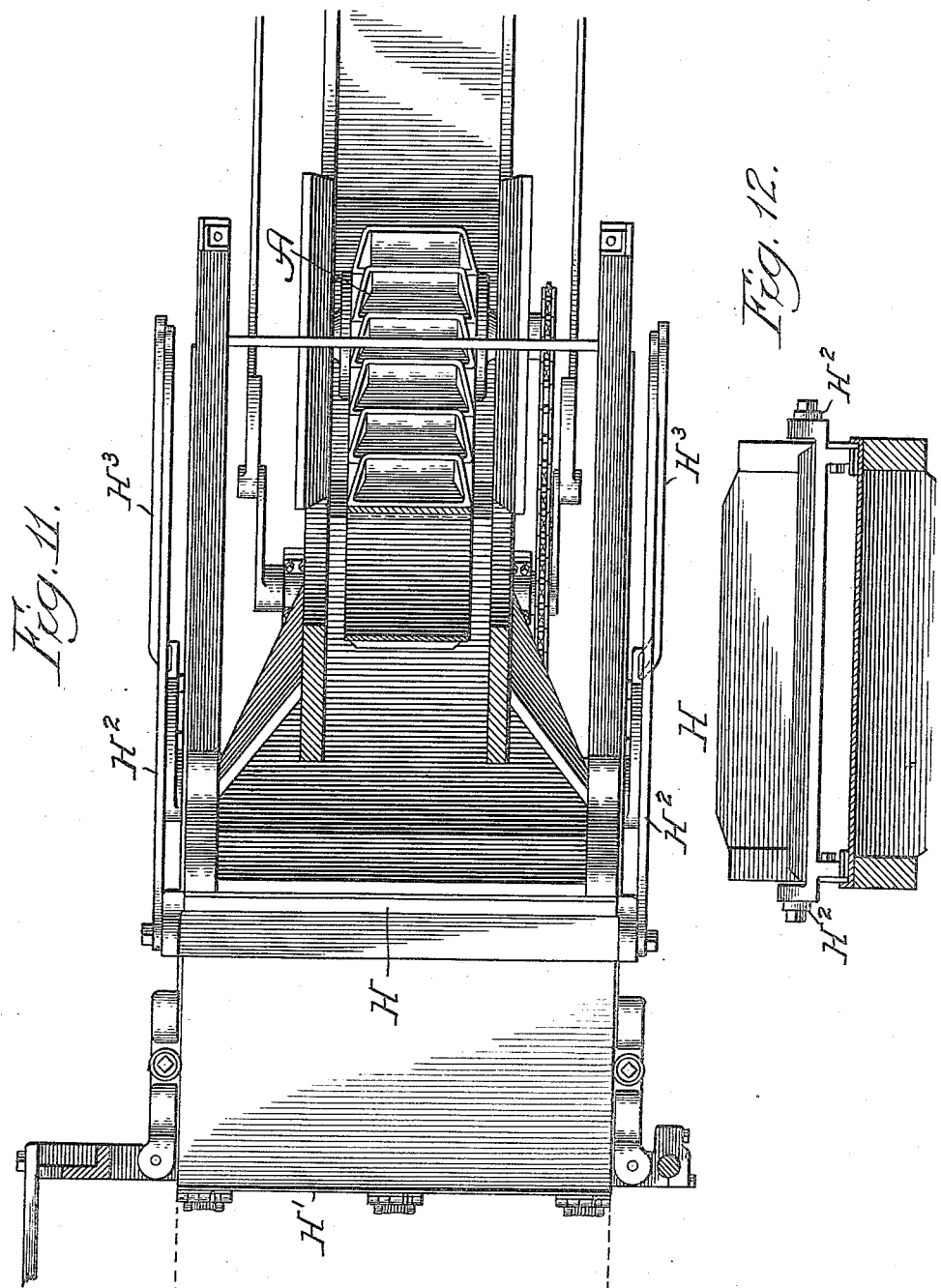

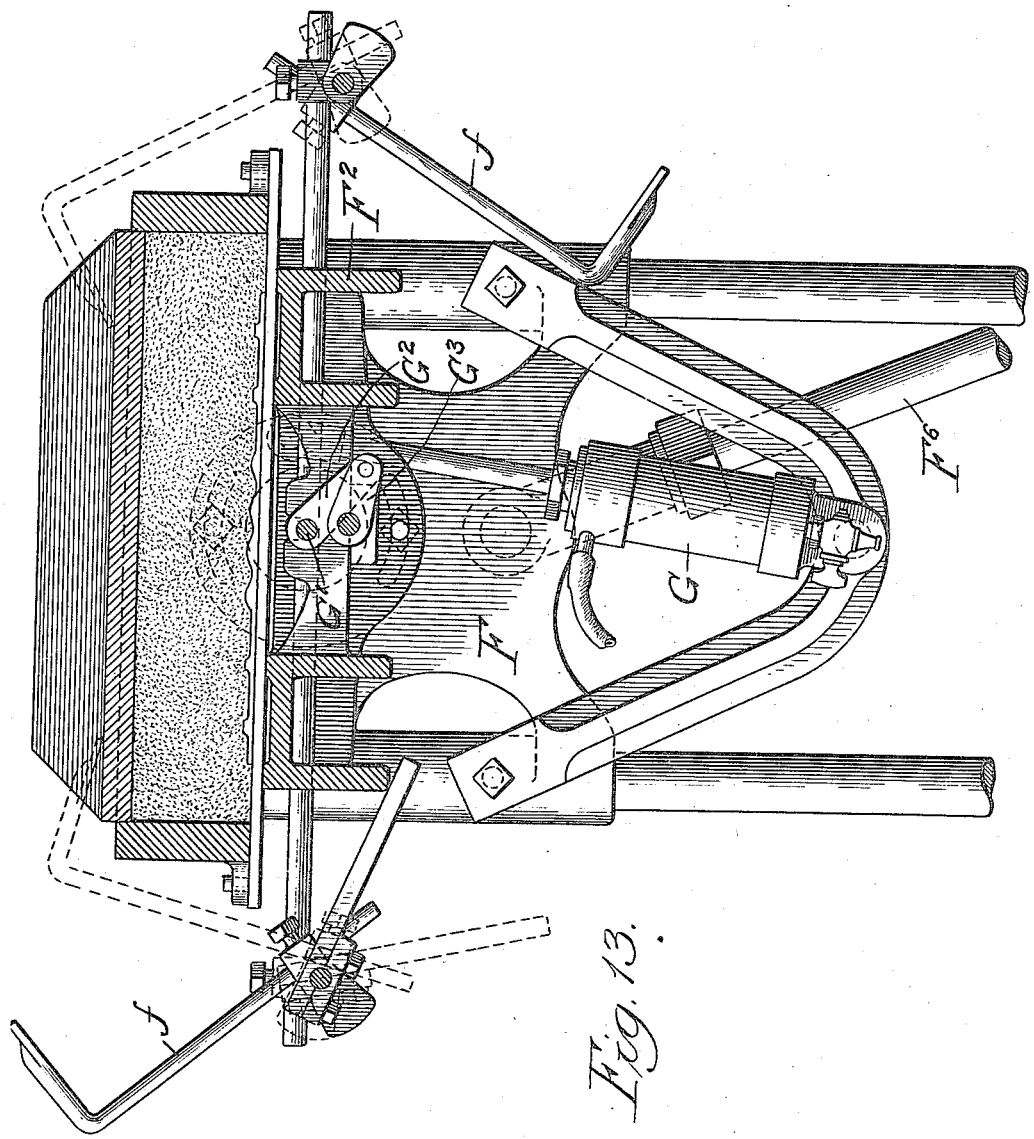

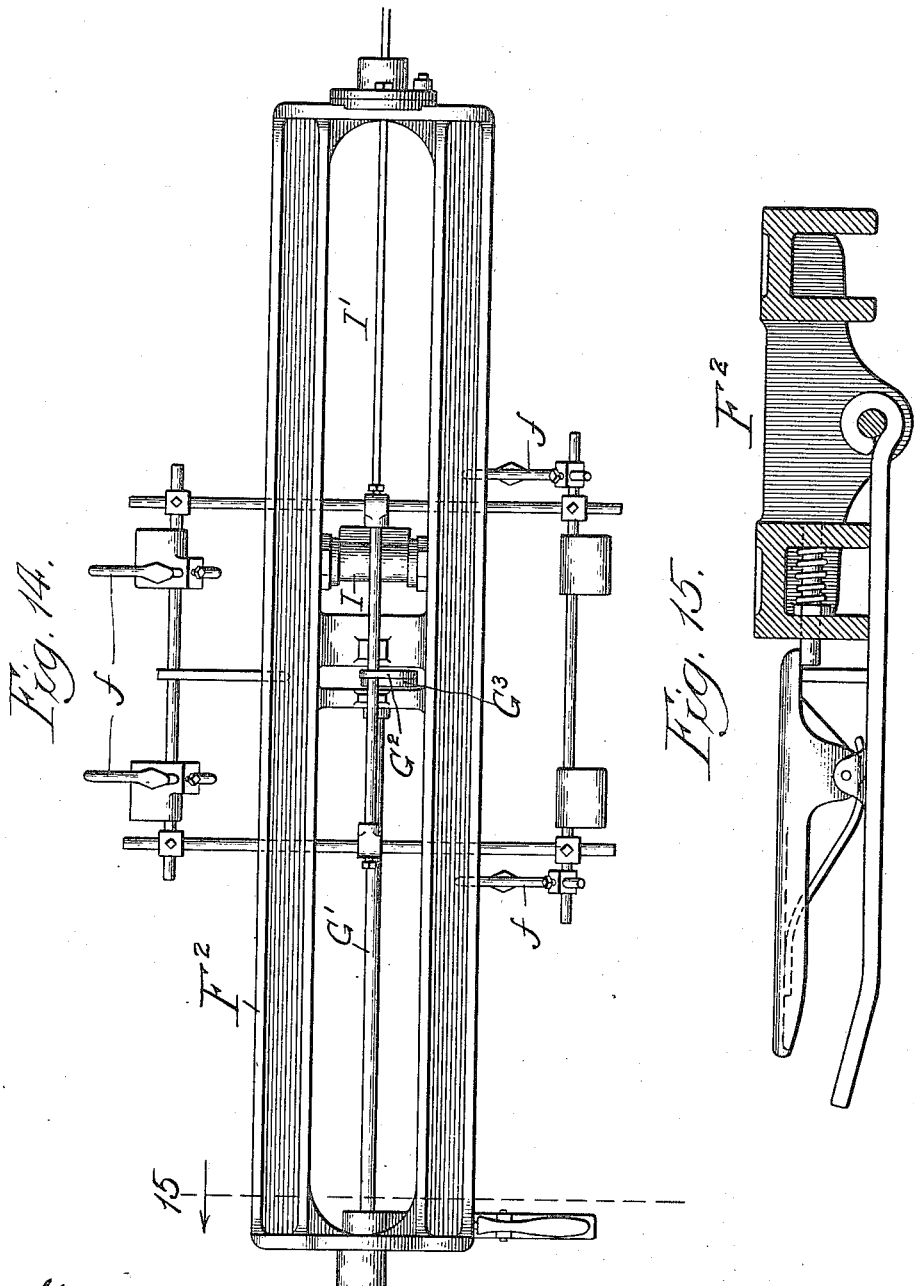

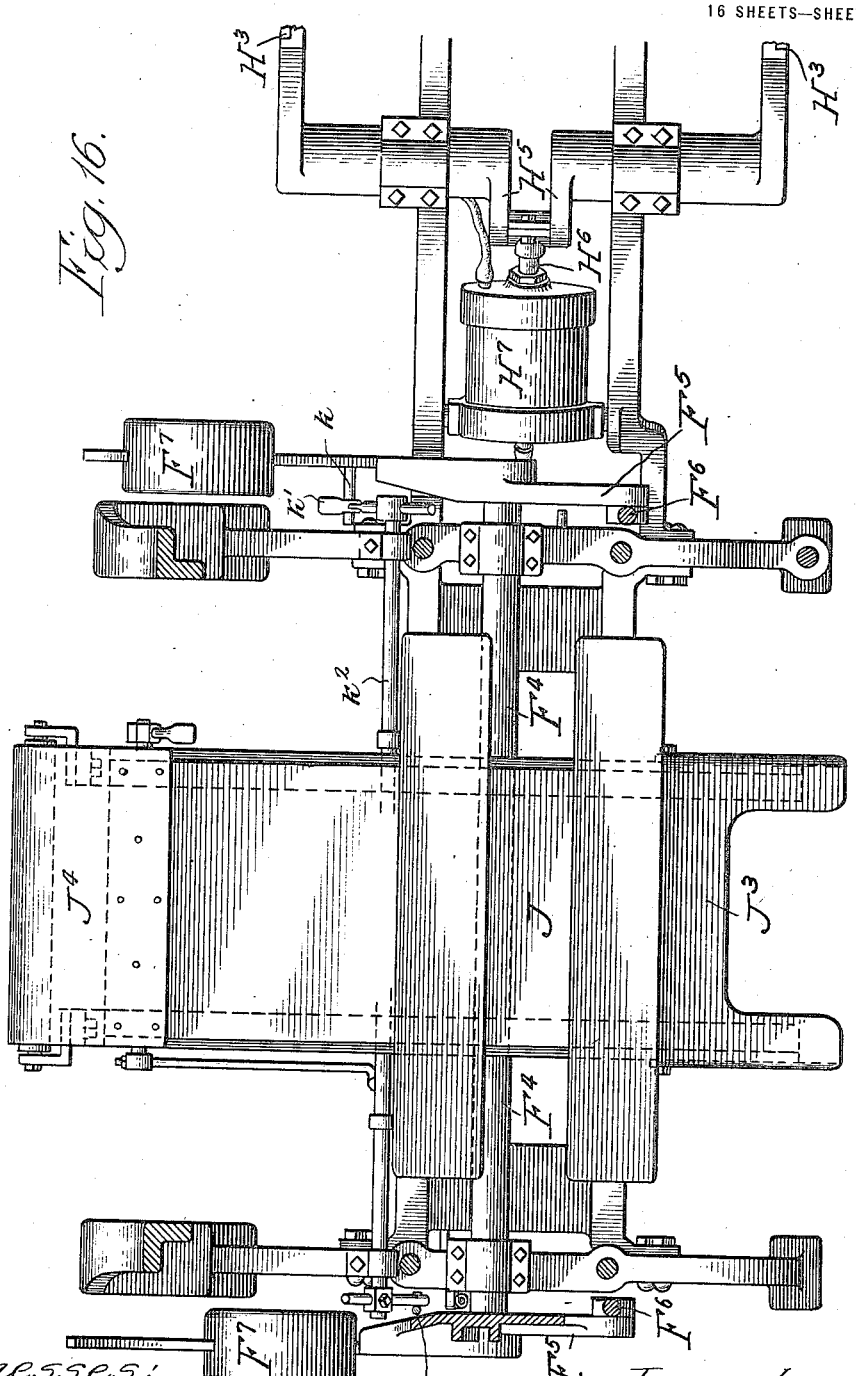

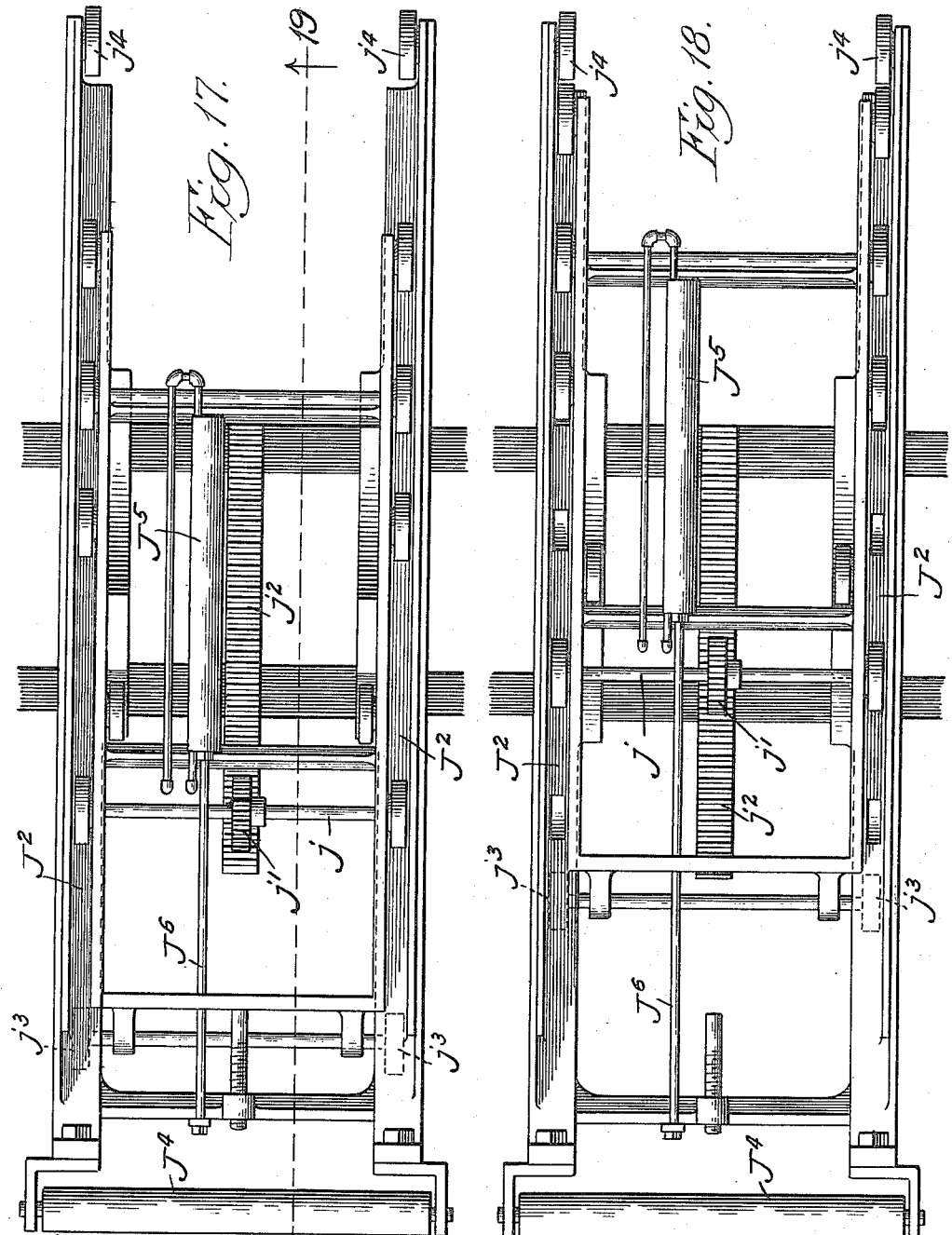

H. TSCHERNING.
MOLDING MACHINE.
APPLICATION FILED JULY 24, 1911.

1,155,019.

Patented Sept. 28, 1915.
16 SHEETS—SHEET 14.

Witnesses:
John Enders
W. T. Jones

Inventor:
Henry Tscherning,
by Dyrenforth, Lee, Chritton & Wiles
Attys.

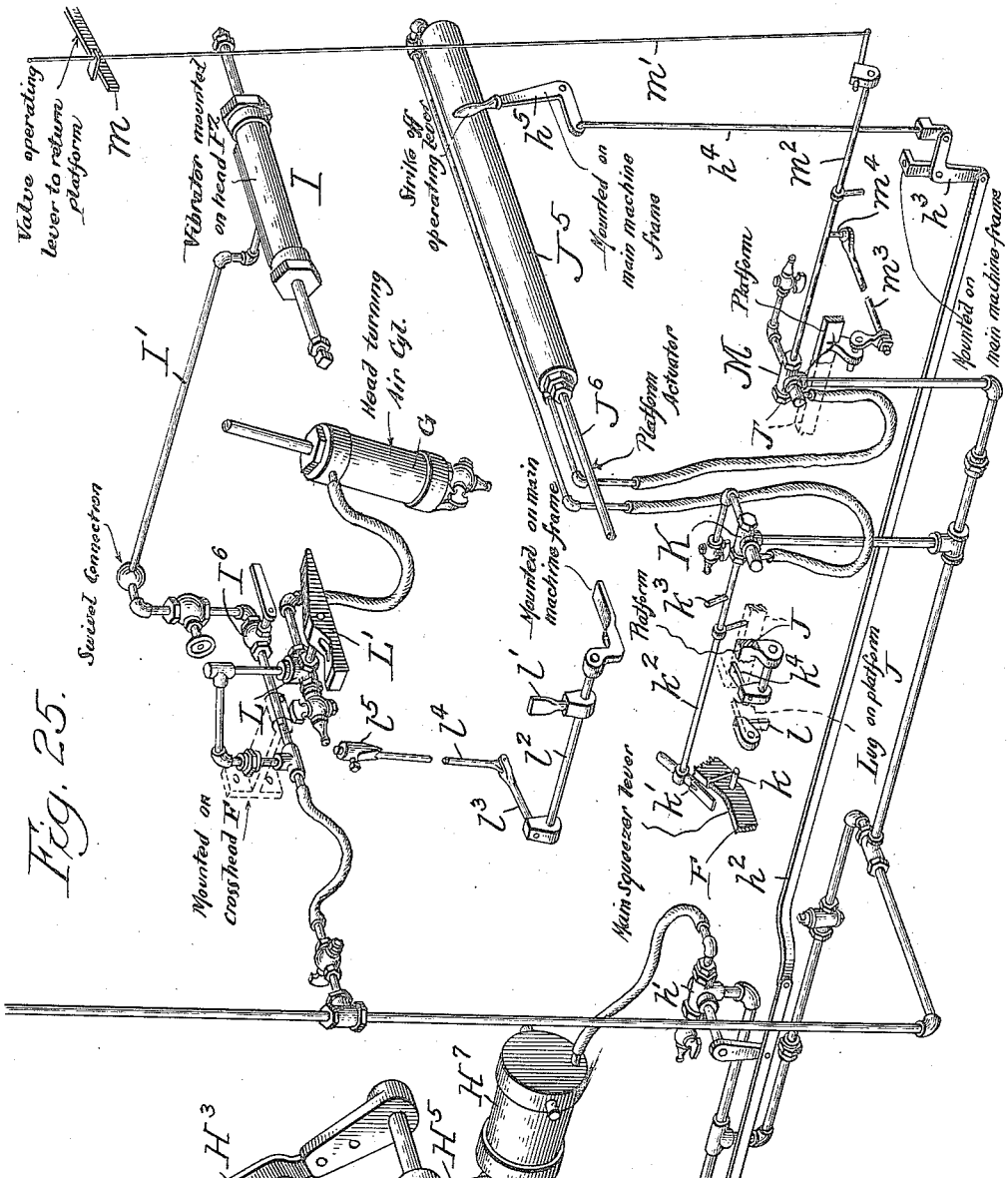

UNITED STATES PATENT OFFICE.

HENRY TSCHERNING, OF FREEPORT, ILLINOIS, ASSIGNOR TO ARCADE MANUFACTURING COMPANY, OF FREEPORT, ILLINOIS, A CORPORATION OF ILLINOIS.

MOLDING-MACHINE.

1,155,019.   Specification of Letters Patent.   Patented Sept. 28, 1915.

Application filed July 24, 1911. Serial No. 640,185.

*To all whom it may concern:*

Be it known that I, HENRY TSCHERNING, a citizen of the United States, residing at Freeport, in the county of Stephenson and State of Illinois, have invented a new and useful Improvement in Molding-Machines, of which the following is a specification.

Figure 1:
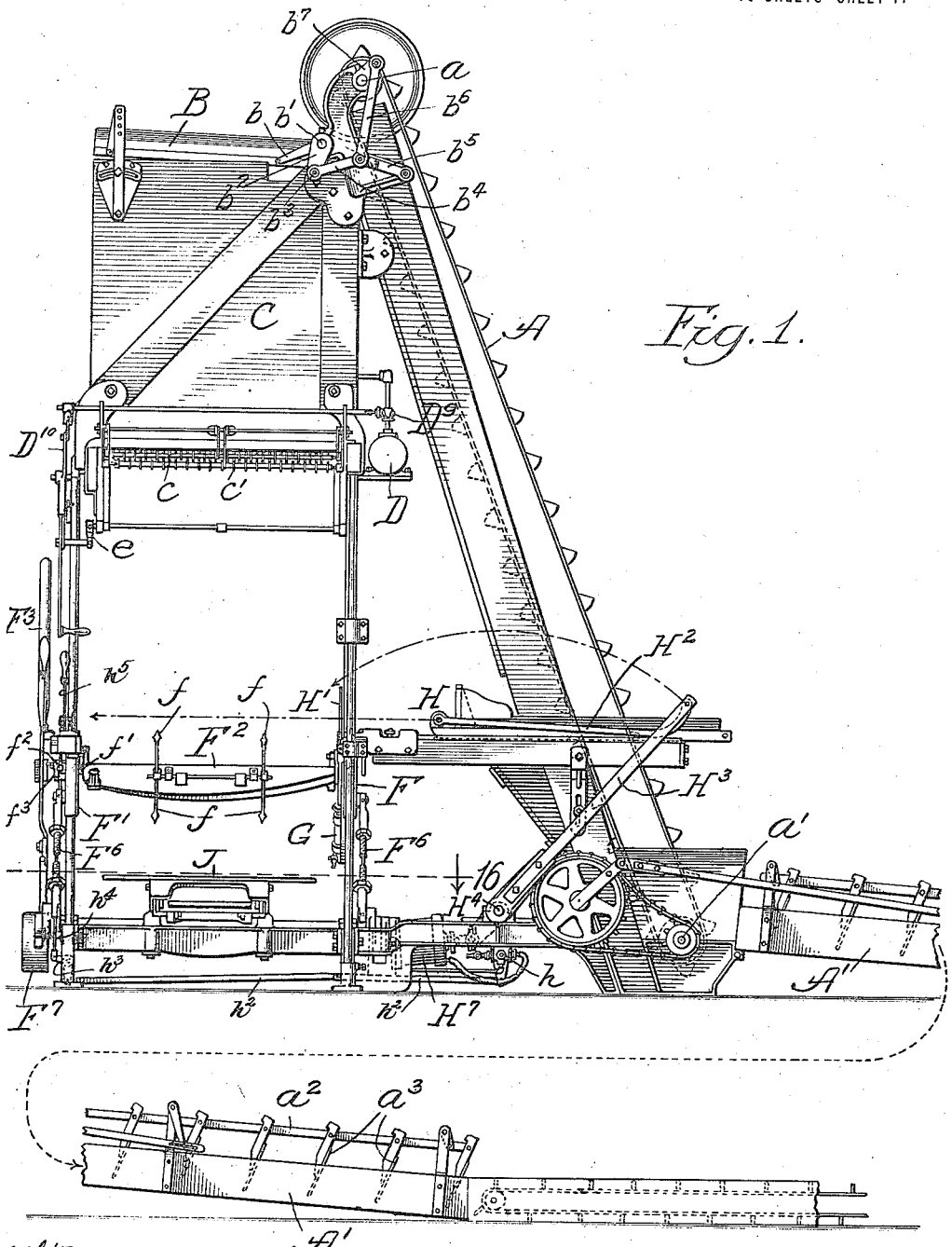
Figure 2:
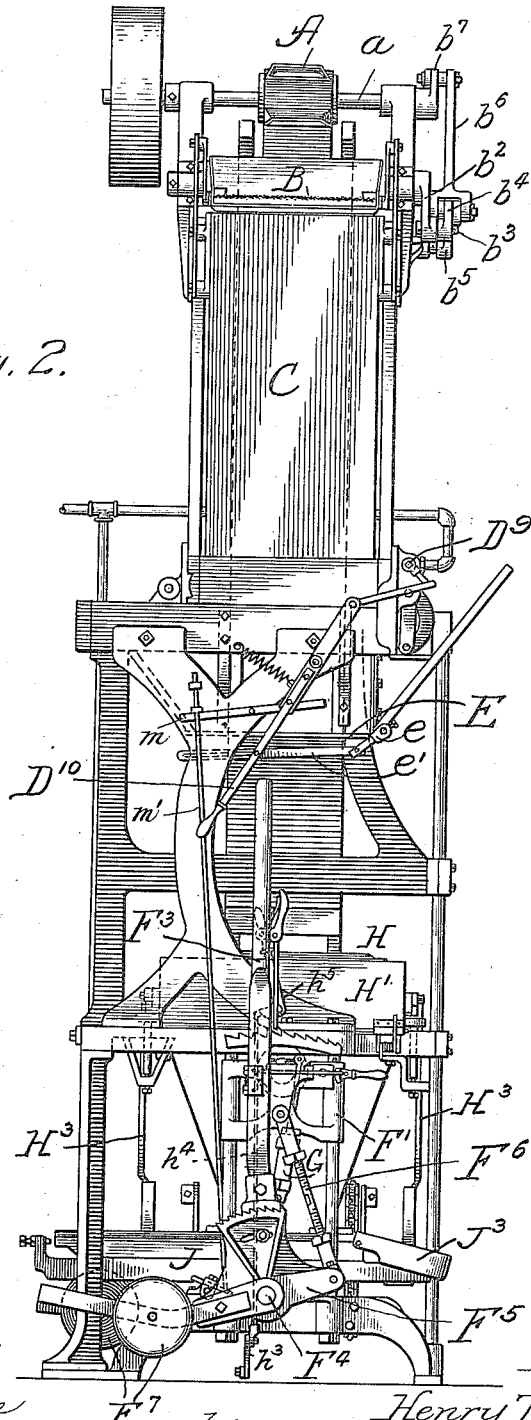
Figure 3:
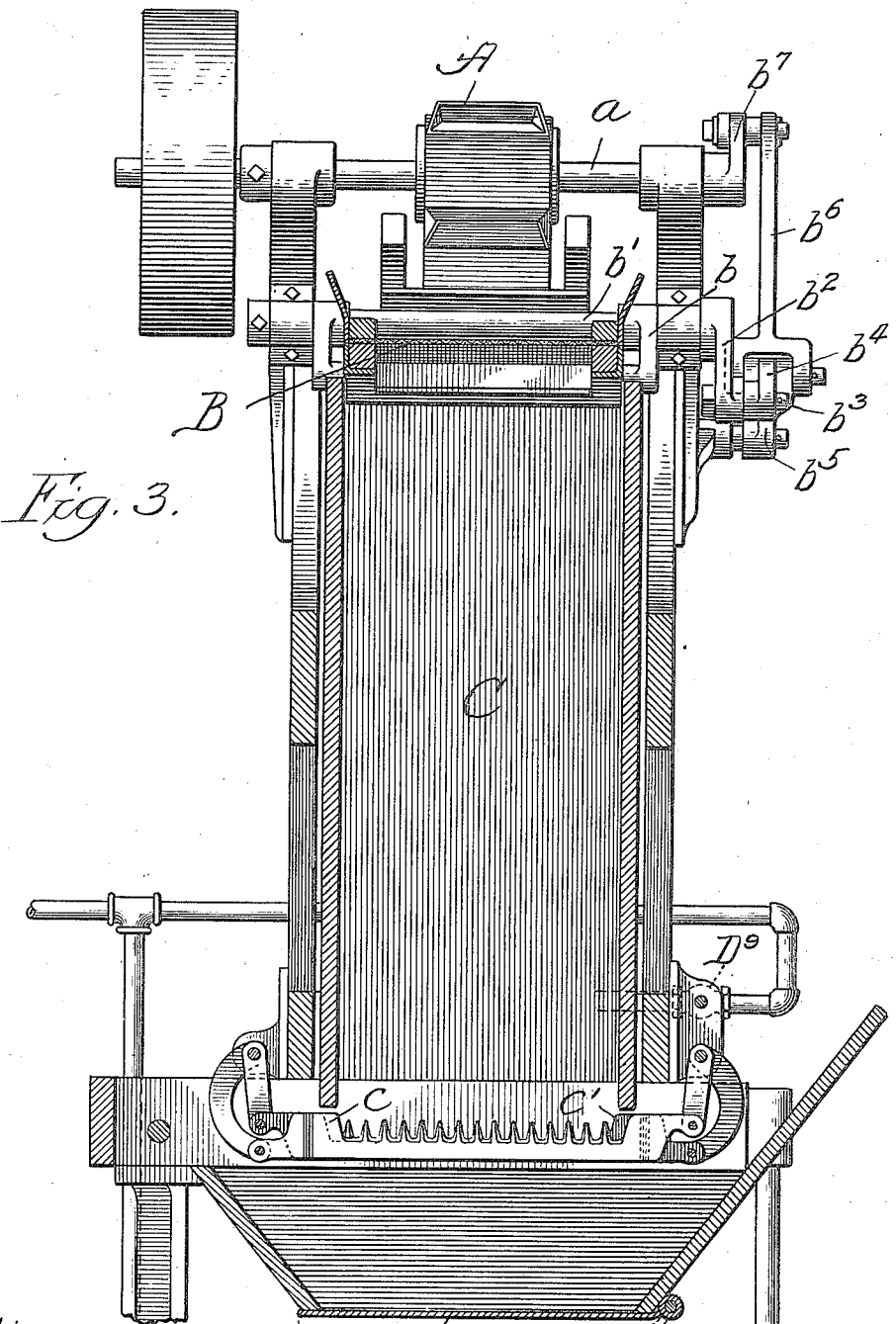
Figure 19:
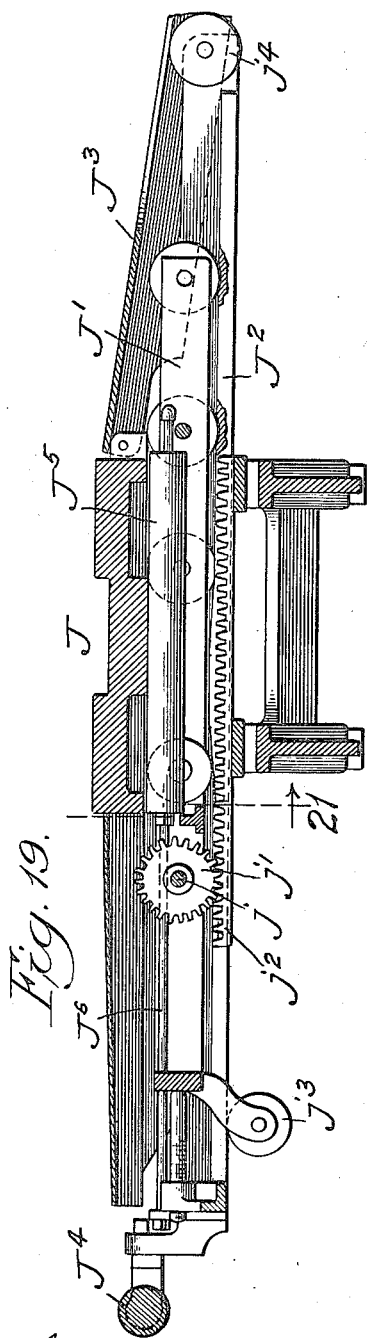
Figure 20:
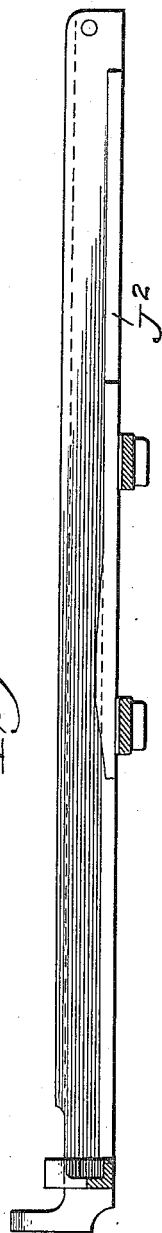
Figure 21:
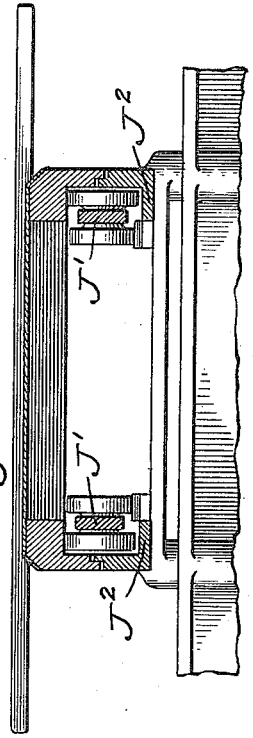
Figure 22:
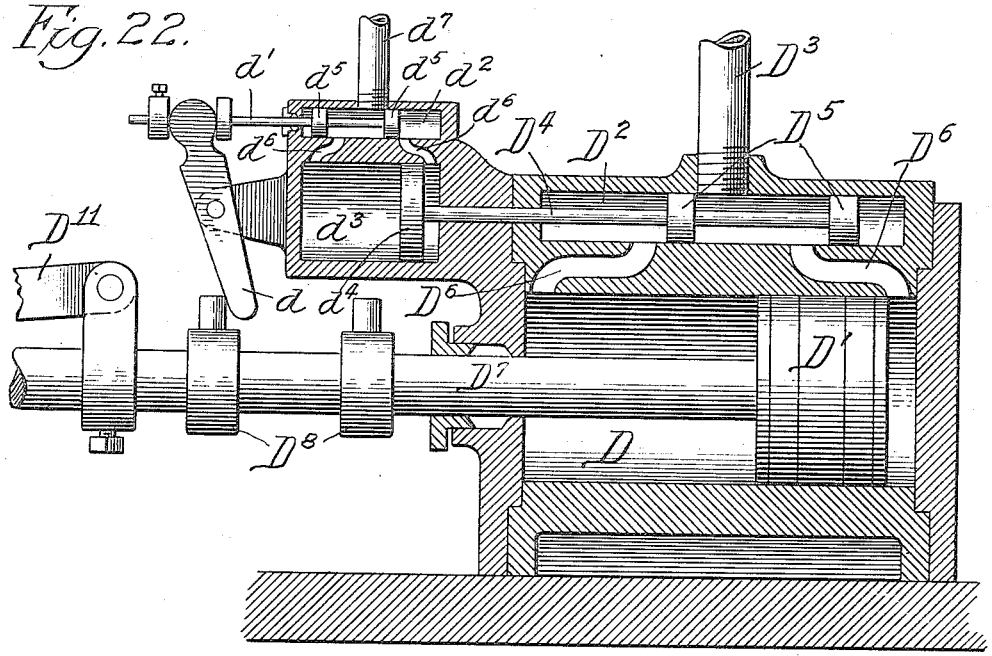
Figure 23:
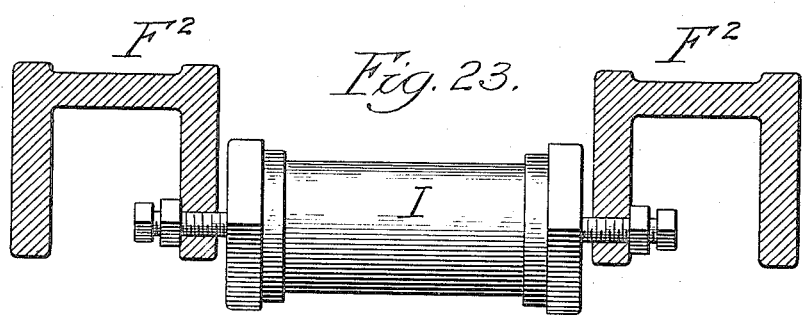
Figure 24:
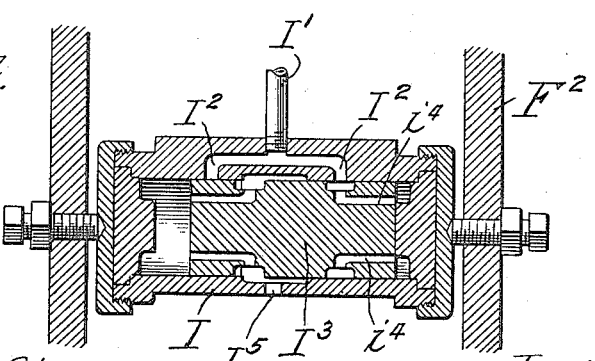

My invention relates to certain new and useful improvements in molding machines, and is fully described and explained in the specification and shown in the accompanying drawings, in which:

Figure 1 is a front elevation of my improved device; Fig. 2 is an end view looking from the left of Fig. 1; Fig. 3 is a longitudinal section through the hopper; Fig. 4 is a front elevation of the upper portion of the hopper, showing the sieve actuating mechanism; Fig. 5 is a view of the grate and its operating mechanism; Fig. 6 is a transverse section showing the grate-bar operating mechanism; Fig. 7 is a detailed elevation looking from the left in Fig. 1 of the lower portion of the machine; Fig. 8 is a horizontal section on the line 8 of Fig. 7; Fig. 9 is a detailed elevation looking from the left in Fig. 1 of the part shown in Fig. 8; Fig. 9ª is a horizontal section through those parts of the squeezing lever shown in Fig. 9, or in other words it is a projection of those parts which in Fig. 9 are shown immediately below it. Fig. 10 is a vertical longitudinal section showing the strike-off mechanism and adjacent parts, that is, the right-hand portion of the mechanism shown in the lower part of Fig. 1; Fig. 11 is a top plan of the part shown in Fig. 10 with the strike-off removed; Fig. 12 is a section on the line 12 of Fig. 10; Fig. 13 is a transverse section through the head showing its operating mechanism; Fig. 14 is an under plan of the head; Fig. 15 is a section on the line 15 of Fig. 14; Fig. 16 is a horizontal section on the line 16 of Fig. 1; Figs. 17 and 18 are plans through the mold-carriage moving mechanism with the carriage proper removed showing the parts in two different positions; Fig. 19 is a transverse section in the plane 19 of Fig. 17 but with the carriage proper in place; Fig. 20 is a longitudinal section in the line 21 of Fig. 19, showing, however, only the carriages and tracks therefor; Fig. 21 is a section on the line 21 of Fig. 19; Fig. 22 is a section through the grate-bar operating piston and adjacent mechanism, the section being taken in the line 22 of Fig. 5; Fig. 23 is a longitudinal section through the head showing the position of the rapper; Fig. 24 is a section through the rapper and Fig. 25 is a diagrammatic perspective illustrating certain of the air-connections of the device and the valves and mechanism by which they are set in motion.

Before proceeding to a detailed description of the various mechanical features of the machine herein shown, I shall first set out by way of general introduction the mode of operation, to the end that as the several parts are more specifically described, their purposes and modes of operation may be apparent.

The molding device proper is of the type having a revoluble head which carries pattern plates usually in the form of match plates. The flask or flasks are placed upon this revoluble head and filled with sand, follower boards are then placed thereupon and the head is inverted and pressed down upon a suitable platform, thus compressing the contents of the flasks. When the head is inverted the flasks are held in position by clamps which release themselves automatically after the squeezing operation, so that when the head is raised, the flasks will be left upon the platform. The platform is then moved forward to bring the flasks from beneath the head into an accessible position and the flasks are removed and carried away. With this very general statement of the kind of a molding machine proper which is used, a more detailed statement of the operation can be made setting forth the entire cycle of operation. Above the head is a sand container into which sand is constantly carried by means of an elevator and from which it can be discharged by the operation of a suitable grate-mechanism at the bottom of the container. The sand falls through a distance of about four feet so as to receive an initial compression in accordance with the method of Patent No. 887,415, the present machine being an improvement upon the apparatus of like date, shown in Patent No. 887,416.

The initial procedure in the use of my machine, as at present constructed, is to place the flasks in position upon the head in the usual manner. A strike-off device is then brought forward over the head immediately above the upper face of the flasks. The strike-off device is in the form of a hollow-rectangular frame, the upper edges of which flare like a hopper so that the sand falling from the container through the grate is guided by this strike-off device into proper position and is kept from spilling upon the adjacent mechanism. The strike-off is moved forward through the means of an air-pressure cylinder under the control of a suitable lever. When the strike-off device has been properly positioned, another lever is pulled by the operator and the grate mechanism is set into operation so that the sand showers down in its finely divided condition, filling the flasks. The strike-off is then retracted, scraping the top of the sand in the flasks to a smooth surface and sweeping any excess of sand into the path of the conveyer or elevator to return it to the container. After the retraction of the strike-off the follower boards are put upon the flasks, the flask-clamps are adjusted and the head is inverted. The main squeezing lever of the machine is then grasped by the operator and the head is brought down to press the flasks, now in inverted position, against the platform provided to receive such pressure. This compression imparts, of course, the necessary coherence to the sand in the flasks. At the very end of the descent of the head a compressed air rapping device which is carried by the head is set into operation so that the jar is imparted to the pattern thereby which, in accordance with common practice, is imparted by tapping the pattern or pounding the head with a maul. The rapping device operates during all of the time when the head occupies its extreme lower position and therefore continues to operate during the commencement of the draw of the pattern with most desirable results.

At the same time when the rapping takes place, the flask-holding clamps automatically release themselves leaving the flasks resting free upon the platform, so that the head may be raised. At the close of the rise of the head, an air-valve is opened letting pressure into a cylinder which moves the platform automatically forward so as to carry the flasks from beneath the head into an accessible position where they may be readily carried away. When the platform reaches its forward limited movement, it trips an air-valve which admits air to a cylinder which again inverts the head turning it back into proper position to receive flasks again. The flasks are placed in position, the strike-off again brought forward and at the moment when the sand dropping lever is operated for the next operation, it simultaneously lets air into the opposite end of the platform-actuating cylinder so as to return the platform to position ready to receive the pair of flasks.

It will thus be understood that the machine is largely automatic in its mode of operation. Hand-pressure is used for the actual squeezing of the sand because it is found that this is an operation in which the personal element ought to enter. Some flasks require more pressure than others and the operator can more satisfactorily perform this work. The remaining operations succeed each other automatically as far as it is practicable but the operations are interrupted at such points as the action of the operator must occur.

Having thus set forth by way of introduction a general mode of operation, the detailed construction can be taken up.

Referring to the drawings, A is an endless chain conveyer which provides for pockets of a usual sort, the same passing at its end about shafts $a$, $a^1$ at the top and bottom respectively. Sand is supplied to the lower end of the elevator A by a conveyer $A^1$ which consists generally of a trough above which is mounted a reciprocating bar $a^2$ having pivoted upon it paddles $a^3$ which can be swung upon their pivots in the direction in which the sand is moving but not in an opposite direction. These paddles will thus by their reciprocation gradually advance the sand along the trough to the lower end of the elevator A, each paddle acting as a member of a hoe. The bar $a^2$ is hung upon suitable links and is reciprocated by crank-motion as fully illustrated in Fig. 1. No novelty is claimed in this form of conveyer, it is therefore not specially described.

The sand from the elevator is dropped upon a sieve B. This sieve is reciprocated by the mechanism shown in Figs. 3 and 4, from which it will be seen that the sieve is attached to the ends of radial arms $b$ upon a rock-shaft $b^1$, another radial arm $b^2$ upon said rock-shaft being pivoted at $b^3$ to a link $b^4$. The link $b^4$ is pivoted to a link $b^5$, the opposite end of which is mounted upon a stationary pivot. The common pivot between the link $b^4$ and $b^5$ has pivotally connected to it the lower end of another link $b^6$, the upper end of which is connected to a crank $b^7$, fast on the end of the shaft $a$. By this mechanism the sieve is given two complete reciprocations for each turn of the crank. That is, when the lower end of the link $b^6$ falls from the position shown in Fig. 4 to its lower limit (that is in half the turn of the crank) it passes the line connecting the pivots of the links $b^4$ and $b^5$, thus forcing the pivot $b^3$ to the left, as viewed in Fig. 4, and again drawing it to the right.

The sand after passing through the sieve B falls into the sand receptacle C and rests upon the two pairs of grate-bars $c$, $c^1$ (Figs.

3 and 5) which are hung upon links and are relatively movable in an ordinary way for the purpose of permitting the sand to pass between them. The mechanism by which the grate-bars are regularly oscillated is shown in Figs. 3, 5, 6 and 22. D is a cylinder containing a piston $D^1$ and above this cylinder is a valve-chest $D^2$ which receives at its center air under pressure from a pipe $D^3$. A valve-rod $D^4$ moves in the valve-chest and has upon it two valve-pistons $D^5$. Ports $D^6$ connect the valve-chamber with the ends of the cylinder D. The piston $D^1$ is connected to a piston rod $D^7$, upon which are collars $D^8$ adapted to strike the end of a lever $d$ pivoted between its ends and having its opposite end connected to a valve-stem $d^1$ movable in the valve-chest $d^2$ supported by a secondary cylinder $d^3$ in which secondary cylinder is a piston $d^4$ fast on the end of the valve-stem $D^4$. The valve-stem $d^1$ has upon it a valve-piston $d^5$ which controls ports $d^6$ leading to the secondary cylinder from its valve-chest. The valve-chest $d^2$ receives air from a pipe $d^7$ and air is admitted to said pipe $D^3$ and $d^7$ by the action of a valve $D^9$ which, through the medium of suitable links, is controlled by the sand-dropping lever $D^{10}$ (Fig. 2). The operation of these parts will be evident from an inspection of the drawings.

When the sand-dropping lever $D^{10}$ is operated air will enter one end or the other of the cylinder D, depending upon the position of the valve-rod $D^4$, and by its action upon the piston $D^1$ will force the piston-rod $D^7$ toward the opposite end of the cylinder until one of the collars $D^8$ strikes the lever $d$ upon which event the valve-stem $d^1$ and the valve-piston $d^5$ will be shifted in the opposite direction. Air will then enter that end of the cylinder $d^3$ which will force the piston $d^4$ and the valve-stem $D^4$ in a direction to cause the air to flow into the opposite end of the cylinder D from that into which it first commenced to flow. This will, of course, drive back the piston $D^1$ until the other collar $D^8$ strikes the lever $d$ shifting it back to its original position. This shift will, in an obvious manner, cause another reciprocation of the piston $D^1$. Through this mechanism, then, the piston-rod $D^7$ is rapidly oscillated in opposite directions. The piston-rod $D^7$ is connected by a link $D^{11}$ with a radial arm upon a rock-shaft $D^{12}$. The rock-shaft $D^{12}$ has, projecting in opposite directions from it, radial arms $D^{15}$ $D^{16}$, connected by links $D^{13}$, $D^{14}$ with the two series of grate-bars, the connection being made through the pins $d^8$. The oscillations of the piston-rod $D^7$ are thus transformed into rotary oscillations of the shaft $D^{12}$ and this in turn into simultaneous opposite reciprocations of the two series of grate-bars. The result is that as long as the sand-dropping lever is held in position to admit air into the cylinders described, the grate-bars will be rapidly reciprocated in opposite directions and sand will fall in an even steady stream and with great rapidity.

In order to prevent the sand which, under normal conditions is prevented from falling between the grate-bars only by its own cohesion, from being jarred down at inconvenient and inopportune moments, the bottom of the receptacle below the grate-bars is normally closed by a guard E (Figs. 2 and 3) in the form of a plate pivoted at the front edge of the receptacle. The pivotal support of this guard E is connected to a radial arm $e$ (Fig. 2) attached to which is a link $e^1$ at the rear end of which is an elongated slot running upon a pin in the sand-dropping lever $D^{10}$. The result is that the initial movement of the sand-dropping lever causes the guard to lower into a vertical position where it will be out of the path of the sand and will at the same time prevent the sand from being spilled forward out of the machine onto the platform, which, at the time the sand commences to fall, is just moving backward to its normal position. When the sand-dropping lever is released, owing to the lost motion caused by the slot in the link $e^1$, it will first turn off the air and then at the end of its movement swing the guard back to its original position.

F and $F^1$ are two head-supporting cross-heads vertically movable upon suitable cross-head guides as illustrated. $F^2$ is a head journaled between said cross-heads and comprising longitudinally-extending members upon the upper face of which the patterns may be secured. The head carries flask-clamps $f$, substantially the same as those shown in Letters Patent No. 793,860, which, as set forth in that patent, will support the flasks when the head is inverted but which are so weighted that when the head is inverted and the flasks pressed, and they are thus relieved from the weight thereof, they will swing apart so as to leave the flasks free upon the platform in order that the head may be raised leaving the flasks behind. $F^3$ is a squeezing lever which is connected to a shaft $F^4$ upon which are radial arms $F^5$ connected by links $F^6$ to the cross-heads F and $F^1$, respectively. By this mechanism the head can readily be depressed, its weight being counter-balanced by weights $F^7$ mounted upon extensions of the arms $F^5$, as illustrated. The head is normally held in its upright position by engagement of a pin $f^1$ transversely movable in the cross-head $F^1$ (Fig. 8). The other end of the pin $f^1$ is actuated by a lever $f^2$ pivoted to a bracket on the cross-head and adapted to be moved by a cam $f^3$ on a head-releasing lever $f^4$ also carried by the bracket on the cross-head. The end of the lever $f^2$ beyond its pivot has a cam $f^x$ which is adapted to be engaged by a hinged leaf $f^5$ upon the squeezing lever when the squeezing lever is moving backward, the hinged leaf swinging away so as not to actuate the cam when the squeezing lever is moving forward. When it is desired to release the head the head-releasing lever is depressed and the head turned over by hand. The cross-heads then brought down in an obvious manner and upon the return of the squeezing lever the rocking pin is again retracted to permit the head to be returned to position.

Referring to Figs. 23 and 24, the interior construction of the rapper is illustrated. Its position in the head is shown in Fig. 14. The rapper consists of a cylinder I supported between the members of the head, having an intake-pipe $I^1$ communicating with two intake-ports $I^2$ toward opposite ends. $I^3$ is a piston freely movable in the rapper, one end thereof having ports $i^4$ symmetrically arranged and cut in its body, said ports being of such length that when the piston is against one end of the cylinder communication will be open, through the port $i^4$ and the intake-port $I^2$, to that end of the cylinder against which the piston rests. Centrally of the cylinder is an annular groove having communication with an exhaust-port $I^5$, the port being so proportioned that at the time when the intake-port is thrown into communication with one end of the cylinder by one of the ports $i^4$, the other end of the cylinder is thrown into communication with the exhaust-port $I^5$ by means of the ports $i^4$ at the other end of the piston. The arrangement is obviously such that as long as compressed air is admitted to the rapper, the piston will shoot rapidly back and forth agitating the cylinder and the head to which it is attached with the desired results. The means whereby air is admitted to the rapper may be varied to any extent whatever, the point being merely that automatic means shall be provided whereby just at the extreme lowermost position of the head this rapping action will take place.

In the diagrammatic arrangement shown in Fig. 25, a valve $I^6$ is shown communicating with and controlling the ingress to the rapper. This valve is so arranged as to be opened by contacting with a stationary part of the frame when the head reaches its lower position. It will be evident that owing to the fact that the head must be inverted a valve will preferably be carried by the cross-head and that the rapper will be connected with the cross-head by means of a pipe having a swiveled connection, such as is illustrated diagrammatically in Fig. 25.

The automatic head-turning mechanism is best shown in Fig. 13. G is an air-cylinder pivoted to a yoke secured to the cross-head F. The piston of this cylinder is connected through suitable adjustable connections with a shaft $G^1$ to rock the same. The shaft $G^1$ has attached to it a radial arm $G^2$ connected by a link $G^3$ with a point upon the head. The admission of compressed air to the cylinder G when the head is in reversed position will through these connections turn the head back to its normal position in an obvious manner.

Referring now to Figs. 1, 10 and 16, the strike-off and its arrangement will be set forth. H is the strike-off proper made in the form of a rectangular frame and adapted to be pushed over the head just above the plane of the top edges of the flasks. $H^1$ is a hinged plate normally held in vertical position as shown in Fig. 10, but arranged to be struck by the strike-off in its forward movement and moved down into the position shown in dotted lines, so as to bridge the space between the adjacent flask and its support upon the frame of the machine, thus preventing any sand falling upon the cross-head and the mechanism carried thereby. The strike-off is propelled by the links $H^2$ connected to its left-hand end at one end and at their other ends to long radial arms $H^3$ on a rock-shaft $H^4$. The shaft $H^4$ has a central crank $H^5$ to which is secured the piston-rod $H^6$ of an oscillatory air-cylinder $H^7$. Air is admitted alternatively to the two ends of this cylinder through two three-way valves, $h$, $h^1$ connected to the two ends thereof. These valves are actuated by means of a long arm $h^2$ connected through the medium of a bell-crank lever $h^3$ and a rod $h^4$ with a strike-off operating lever $h^5$. The connections of the valve $h$, $h^1$ are such that under all conditions one or the other is opening communication between its end of the cylinder and the source of compressed air, while the other valve is opening its end of the cylinder to the atmosphere. Thus when the operator pulls the strike-off lever forward, the strike-off advances into proper position for the sand to drop through it into the flask. When the strike-off lever is pushed back, the setting of the valves is reversed and the strike-off instantly moves backward scraping the sand to a smooth, even level on top of the flasks and sweeping it into a hopper-shaped chute which deposits it at the foot of the elevator. The ports are arranged in an obvious manner in such a way that the moving parts are to the greatest possible extent protected from sand, ordinary coverings of metal or wood, not necessary to be here described in detail, being provided wherever necessary for this purpose.

Referring to Figs. 16 to 21 inclusive, the construction of the moving platform and its operating mechanism can be best understood. J is the platform upon which the flasks are squeezed. J¹ is an intermediate carriage and J² represents the track upon which the carriage runs. The construction is substantially that illustrated in Patent No. 793,860 referred to, in that when the platform is in its rear position ready to receive a flask it rests upon the tracks and the movement forward of the intermediate carriage first elevates the platform off the tracks and then slides it forward at double the speed of the carriage in the manner set forth in that patent. As far as the carriage and platform construction is concerned, it differs from that shown in the patent referred to only in minor particulars. The number of rollers is increased and the rear set of carriage rollers which runs upon the track aforesaid is mounted upon a shaft $j$ which is provided with a pinion $j^1$ meshing with a rack $j^2$ stationarily mounted so that the initial rotation is made positive. The rear of the carriage is provided with rollers $j^3$ which underlie the stationary tracks. The front of the platform has pivoted to it a shield J³ which rests upon rollers $j^4$ so that when the platform moves forward the shield falls into a vertical position, but when the platform is in its rear position, the shield covers the tracks and rollers, it being however centrally cut away to permit the operator to stand between the ends of the tracks. For the purpose of protecting the rear part of the carriage and platform mechanism, a spring actuated curtain J⁴ is placed at the rear of the stationary tracks the same being connected to the rear of the platform proper so that when the platform moves forward the curtain is unwound, thus covering the tracks preventing any sand from falling thereon.

The carriage has fast in it a cylinder J⁵ to either end of which air may be admitted. Within this cylinder J⁵ is a piston fast upon a piston-rod J⁶ the rear end of which is fast in the frame of the machine. As a result the admission of air to the front end of the cylinder will move the carriage platform forward, and the admission of air to the rear end thereof will move the carriage platform backward.

The main features of the machine proper have now been set forth—that is to say, the construction of the larger parts of the machinery, the cylinder and the direct means by which they are actuated in each case. So far, however, comparatively little has been said of the means by which these cylinders are brought into operation. This is caused largely by reason of the fact that most of the air-valves and the air-valve mechanism are so small that they cannot properly be indicated on a corresponding scale with the remaining parts of the machine and they are all shown in the diagrammatic Fig. 25. Referring now to this figure, the general operation will be recapitulated and at the same time such of the air-connections as have not already been set forth will be described in detail. It will be understood from the foregoing description that the first step in operating the machine is to place the flasks in position and then to bring forward the strike-off through the medium of the strike-off lever $h^5$. The sand is then dropped by means of the dropping mechanism which is not shown on Fig. 25. The flasks are then locked in position, the head inverted, and the pressure applied by hand. At the close of the descent of the head the valve I⁶ (Fig. 25) is opened and the rapper is actuated. The clamps then automatically release themselves, the head is raised and the pattern drawn. This leaves the flasks on the platform. The first of the automatic operations, that is, operations which automatically follow each other, then takes place. K is a three-way valve which can open communication from the front end of the cylinder J⁵ which moves the platform, either to the atmosphere or to the compressed air-supply, according as it is turned in either direction. The main squeezing lever carries a pin $k$ and the valve-stem of the three-way valve K has upon it a finger $k^1$ pivoted to said shaft by means of a rule-joint which will swing freely upward but not downward. Upon the descent of the head this then moves up over the rule-joint in an obvious manner, accomplishing no result, but when the head is raised, the pin moves down engaging the finger $k^1$ opening the air-supply to the front end of the cylinder so that the platform moves forward carrying the flasks with it. When the platform reaches its forward position, a projection $k^4$ thereon strikes a finger $k^3$ on the shaft $k^2$ rotating the shaft in the opposite direction, cutting off the compressed air from the cylinder J⁵ and opening the same to the atmosphere in preparation for the admission of pressure to the opposite end of the cylinder. At the same time a projection $l$ mounted on the platform engages the finger $l^1$ on a rock-shaft $l^2$ which has a radial arm $l^3$ connected to a vertical link $l^4$ upon the upper end of which is a block $l^5$ having a knife edge at its lower end. L is a valve upon the stem of which is a lever L¹ pivoted at its rear end to receive the link $l^4$ and adapted to be engaged on its upper portion by the block $l^5$ carried thereby. The valve L and the parts connected therewith move with the cross-head and this sliding connection with the link is therefore necessary. When the cross-head is in its upper position, however, the rocking of the shaft $l^2$ will in an obvious manner open the valve admitting air to invert the head. In the meantime the snap-flasks will have been unlocked from the molds, the molds formed will have been carried away and the snap-flasks will be ready to be placed in position upon the head just as the same reaches its upright position. Thereupon the foregoing operations will be repeated. That is, the strike-off will be brought forward, the sand will be dropped through the medium of the sand-dropping lever $D^{10}$ (Fig. 2). This lever, however, is connected so as to operate automatically a lever $m$ (Fig. 25) which, when the sand-dropping lever is pulled raises a long link $m^1$ which rocks a shaft $m^2$ acting as the valve-stem of a three-way valve M, which controls the flow of air to the rear of the cylinder $J^5$. Thus when the sand-dropping lever is pulled, the platform automatically moves back. When it reaches its rear position the air is cut off and the rear of the cylinder $J^5$ is opened to the atmosphere through the medium of a rod $m^3$ connected to a radial pin $m^4$ on the shaft $m^2$ by a sliding connection. This obviously brings all the parts into position to continue their operation.

It will be seen that the machine thus described is of a simple and efficient character. The operations in so far as possible succeed each other rapidly and automatically, so that very rapid work can be done.

It will be obvious that the various features of construction herein shown and described in detail can be modified to a very large extent without in any way departing from the principle involved, which I consider to be my invention. The machine has been described in detail in order that the preferred form of embodiment of the invention may be duplicated by an ordinary mechanic, but by such description it is not intended to limit the scope of protection; my intention being to claim all the novel features disclosed in the construction as broadly as this state of the art will permit.

What I claim as new and desire to secure by Letters Patent is—

1. In combination a vertically movable and revoluble head carrying a pattern, means to secure a flask to the head when in inverted position, a horizontally-movable platform to receive the flask with its contained mold and between which and the head the mold is pressed, means for vertically reciprocating the head, and means for automatically advancing the platform after the rise of the head.

2. In combination a vertically-movable head, a horizontally-movable platform, means for depressing and elevating the head, an air-cylinder connected with the platform and means operated by the rise of the head for admitting air thereto to advance the platform, and means for cutting off the air when the platform reaches its forward position.

3. In combination a vertically-movable head, a horizontally-movable platform adapted to receive the molds, means for depressing and elevating the head, an air-cylinder connected to the platform, an air-valve to control the admission of air thereto, a finger pivoted to the stem of said air-valve by a rule-joint, in position to be engaged by a part movable with the head, whereby the descent of the head, will not operate the valve but its ascent will admit air to advance the platform.

4. In combination a vertically-movable head, a horizontally-movable platform beneath the same to receive the molds, means for depressing and elevating the head and means for automatically advancing the platform upon the rise of the head, sand-dropping means, a lever for controlling the operation thereof, and means for returning the platform upon the movement of said lever.

5. In combination a vertically-movable head, a horizontally-movable platform, means for depressing and elevating the head, an air-cylinder connected with the platform and means operated by the rise of the head for admitting air thereto to advance the platform, sand-dropping means, a lever for controlling the operation thereof, a second air-valve which admits air to the opposite end of the cylinder when said lever is operated.

6. In combination a vertically-movable head, a horizontally-movable platform, means for depressing and elevating the head, an air-cylinder connected with the platform and means operated by the rise of the head for admitting air thereto to advance the platform, and means for cutting off the air when the platform reaches its forward position, sand-dropping means, a lever for controlling the operation thereof, a second air-valve which admits air to the opposite end of the cylinder when said lever is operated, and means for cutting off the air from said end of the cylinder when the platform reaches its rear position.

7. In combination a vertically-movable head, a horizontally-movable platform adapted to receive the molds, means for depressing and elevating the head, an air-cylinder connected to the platform, an air-valve to control the admission of air thereto, a finger, pivoted to the stem of said air-valve by a rule-joint in position to be engaged by a part movable with the head, whereby the descent of the head will not operate the valve but its ascent will admit air to advance the platform, sand-dropping means, a lever for controlling the operation thereof, a second air-valve which admits air to the opposite end of the cylinder when said lever is operated, and means for cutting off the air from said end of the cylinder when the platform reaches its rear position.

8. In combination a vertical and rotatable head to receive a flask, a platform upon which when the head is inverted the flask is pressed and upon which it is left after pressure, means for operating the head, means for advancing the platform and automatic means for inverting the head.

9. In combination a vertical and rotatable head to receive a flask, a platform upon which when the head is inverted the flask is pressed and upon which it is left after pressure, means for elevating and depressing the head, and automatic means for inverting the head to turn it to normal position after inversion.

10. In combination a vertically-movable and rotatable head to receive a flask, a platform upon which when the head is inverted the flask is pressed and upon which it is left after pressure, means for reciprocating the head, an air-cylinder and a piston therein connected to the head to invert the same, and means for automatically admitting air into the cylinder to invert the head.

11. In combination a vertically-movable and rotatable head to receive the flask, a platform upon which when the head is inverted the flask is pressed and upon which it is left after pressure, means for reciprocating the head, means for advancing the platform, an air-cylinder and a piston therein connected to the head to return the same to normal position and means for automatically admitting air to the cylinder for the purpose of turning the head.

12. In combination a vertically-movable and rotatable head to receive a flask, a platform upon which when the head is inverted the flask is pressed and upon which it is left after pressure, means for vertically-reciprocating the head, means for advancing the platform and means operated by the advancement of the platform for inverting the head.

13. In combination a vertically-movable and rotatable head to receive a flask, a platform upon which when the head is inverted the flask may be pressed and upon which it may be left after pressure, means for reciprocating the head, means for advancing the platform, an air-cylinder and a piston connected to the head to invert the same by its action, and means operated by the advance of the platform for admitting air to the cylinder to turn the head back to its normal position.

14. In combination a vertically-movable and rotatable head, a platform upon which when the head is inverted a flask may be placed and upon which it is left after pressure, means for reciprocating the head, head-locking means, and means operated as the head rises to withdraw the locking means preparatory to an inverting movement and automatic means for inverting the head after it rises.

15. In combination a flask-receiving head, a stationary sand receptacle directly above the head, means for discharging sand in finely divided condition therefrom to fall by gravity into the flasks carried by the head, a strike-off device in the form of a rectangular frame at the level of the top of the flask, and means for advancing the strike-off device to surround the space immediately above the flasks to guide the falling sand into the same, and means for withdrawing the strike-off device after the dropping of the sand has ceased to strike off the tops of the molds.

16. In combination a sand receptacle with sifting means at its lower end, a pivoted guard normally lying beneath the sifting means, for the purpose set forth, and means for swinging said pivoted guard from beneath the sifting means into vertical position when the sifting means begins to operate and for returning the same at the close of the operation of the sifting means.

17. In combination a flask-receiving head, a platform to receive the flasks from the head, tracks upon which the platform runs, a stationary roller carrying a curtain one end of which is attached to the platform whereby when the platform moves forward the curtain covers the tracks.

18. In combination a flask-receiving head, a platform to receive the flasks from the head, tracks upon which the platform runs, and a shield pivoted to the front of the platform to cover the tracks in advance of the same and, when the platform is advanced, arranged to swing down into a vertical position.

19. In combination a flask-receiving head, a platform to receive the flasks from the head, tracks upon which the platform runs, and a shield pivoted to the front of the platform to cover the tracks in advance of the same and, when the platform is advanced, arranged to swing down into a vertical position, said shield being centrally notched to permit the operator to approach the platform.

In testimony whereof I have hereunto set my hand and affixed my seal this 22nd day of Feb., 1911.

HENRY TSCHERNING. [L. S.]

In the presence of two subscribing witnesses:
C. L. MUNN, Jr.,
REEVE BURTON.